Patented May 29, 1928.

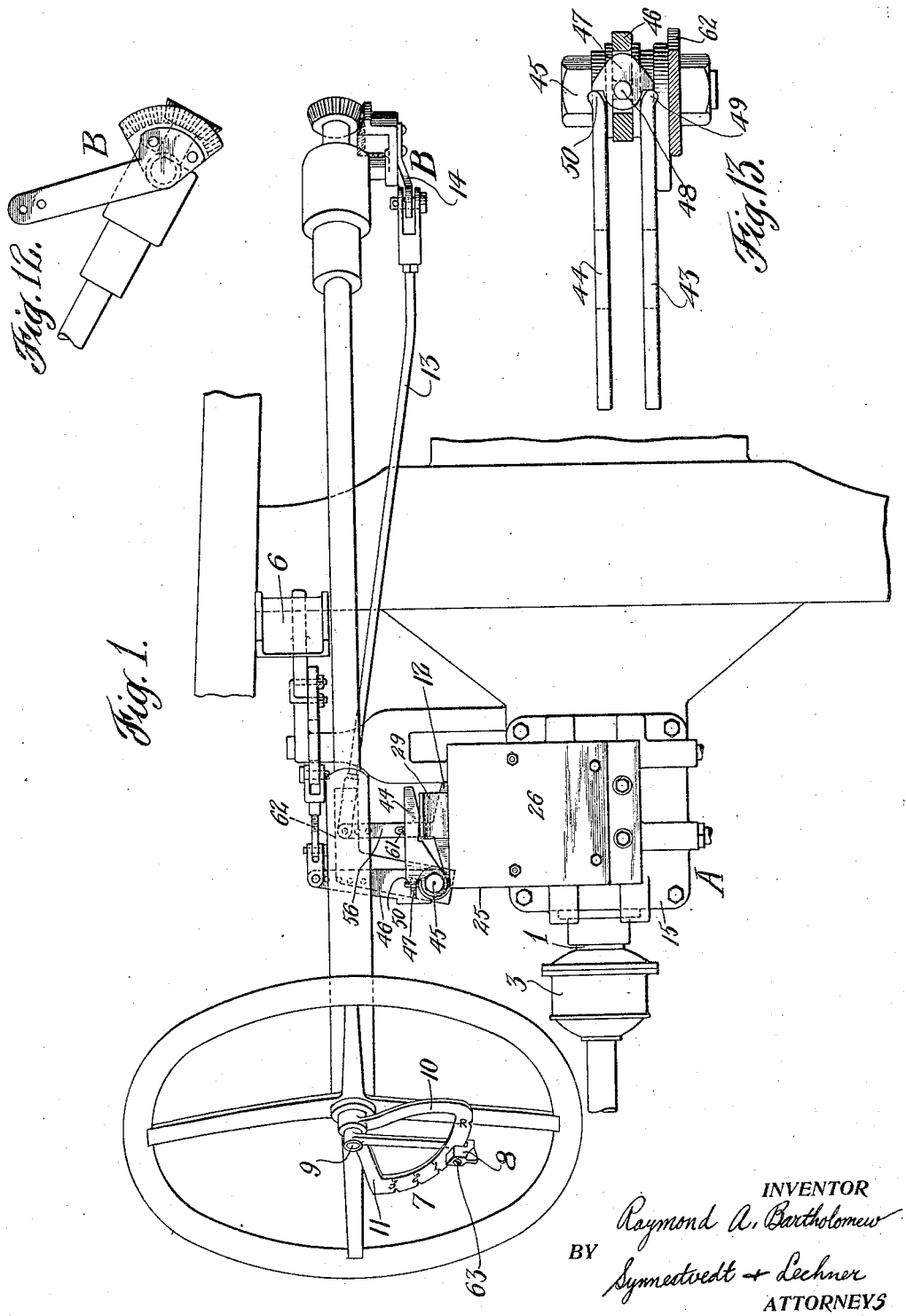

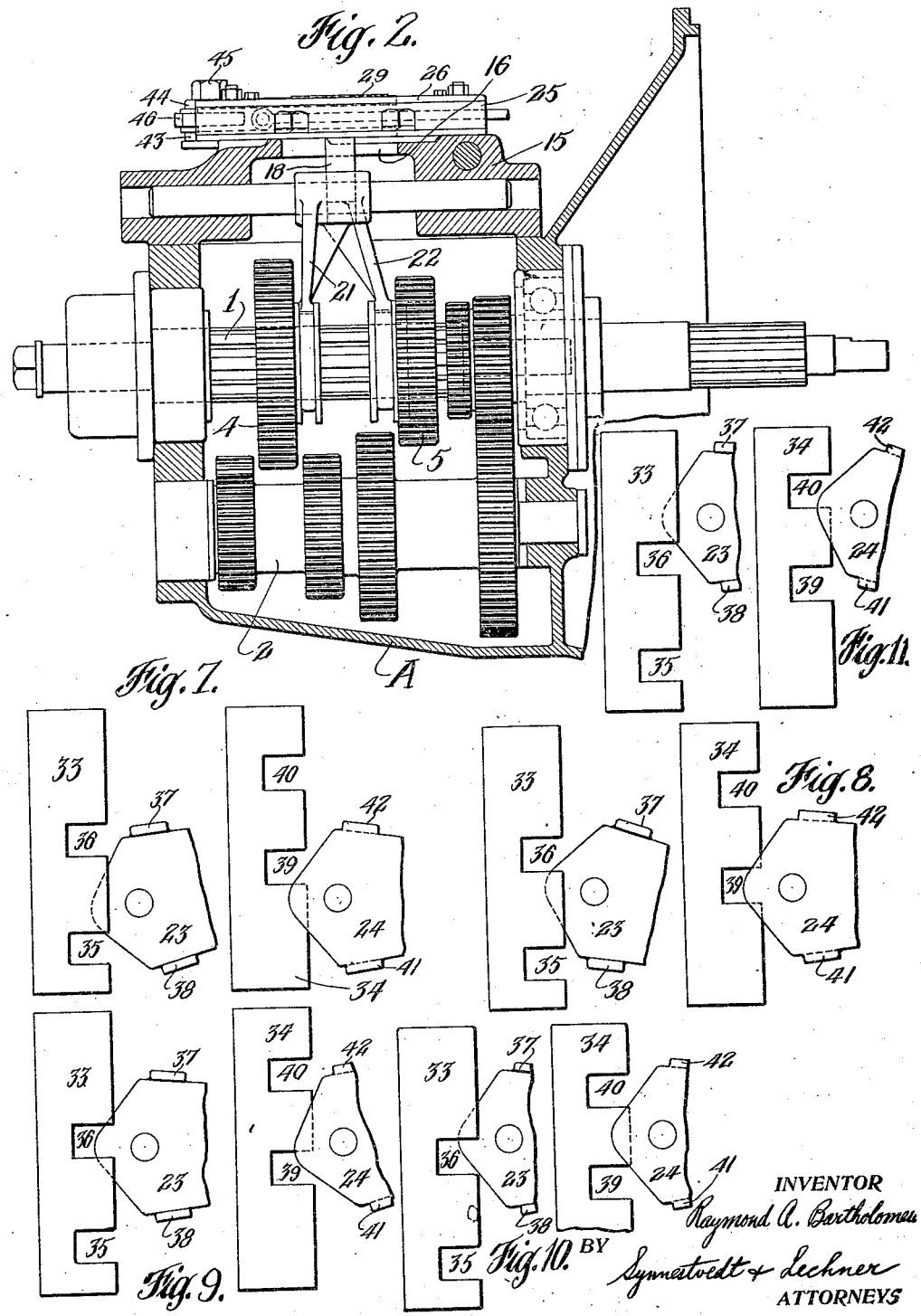

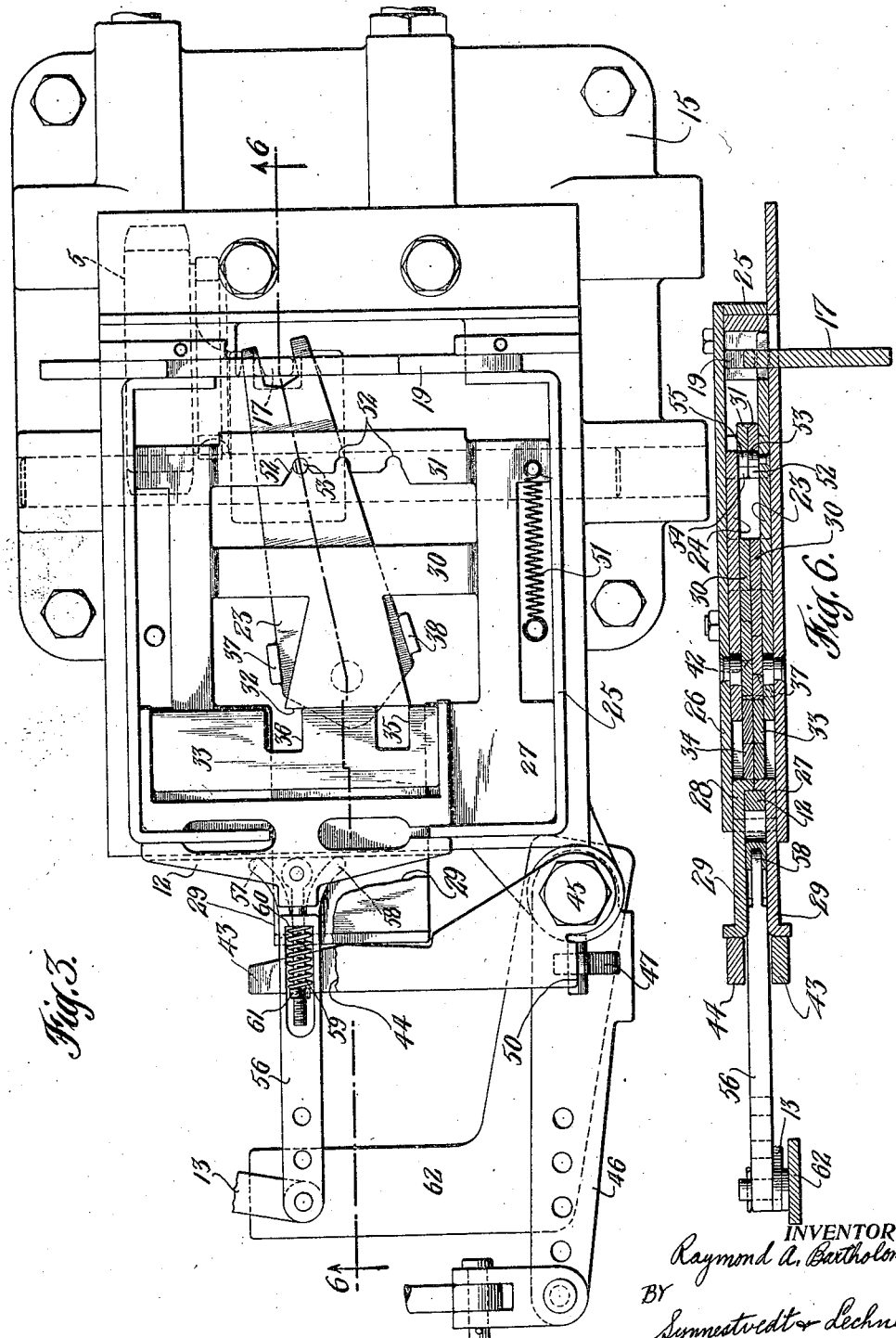

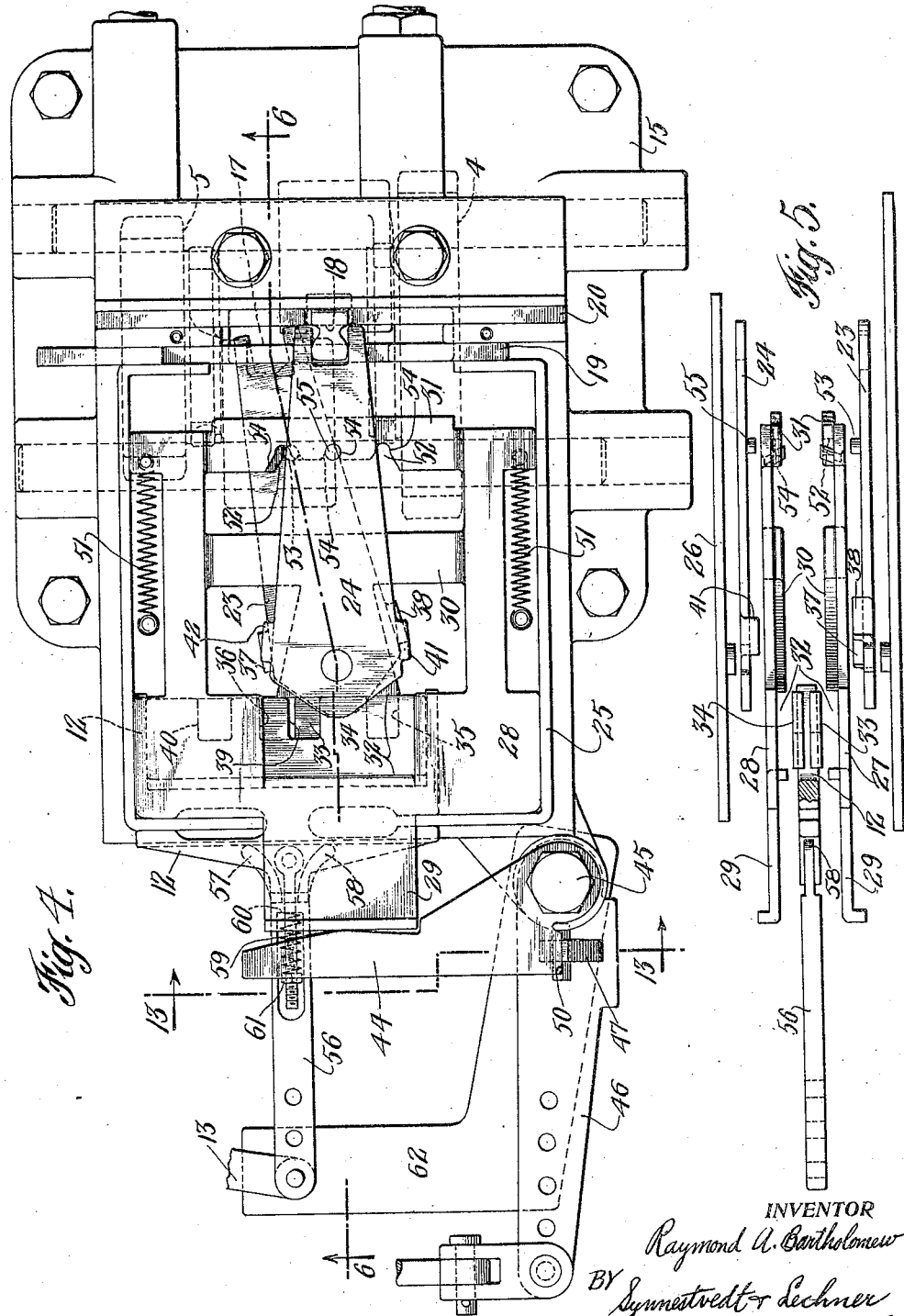

1,671,339

UNITED STATES PATENT OFFICE.

RAYMOND A. BARTHOLOMEW, OF BROOKLYN, NEW YORK.

CHANGE-SPEED DEVICE FOR AUTOMOTIVE VEHICLES.

Application filed October 24, 1924. Serial No. 745,595.

This invention relates to a selective gear shift or change speed device for automobiles and the like, in which changes of gear ratios may be made by manipulation of a simple setting device located on the steering column and by actuating a pedal such as for instance the usual clutch pedal, to shift the gears to the selected position.

One of the primary objects of my invention is the provision of a simple, compact and effective mechanism of this character utilizing a minimum of parts arranged in close relation so that the overall dimensions of the existing gear boxes in automobiles now in use will not be materially increased and to which it may be readily applied without material changes.

Another object of my invention is the provision of a mechanism of this character in which the parts are of such construction as to be manufactured at a minimum cost.

Another object of my invention is the provision of a device in which selection can be made at the steering column without strain on the mechanism irrespective of the positions of the remaining parts of the mechanism. This is an improvement on the mechanical gear shift device of my copending application Serial No. 516,617, filed November 21st, 1921.

The foregoing together with such other objects as may hereinafter appear, or are incident to my invention. I obtain by means of a construction which I have illustrated in preferred form in the accompanying drawings, wherein:

Fig. 1 is a plan view illustrating the application of my improvements to a gear box of a standard type, such as employed in a Hudson car;

Fig. 2 is a section through such gear box with my invention shown applied thereto and in full view;

Fig. 3 is a plan view of my device with the cover plate removed and showing the position of the parts with the high or third speed gear in driving position, the parts which effect first and reverse speeds being omitted;

Fig. 4 is a similar view to Fig. 3 but showing all of the operating parts in place;

Fig. 5 is an edge view of the various operating parts, showing their relation one to the other in their respective order of assembly;

Fig. 6 is a cross section on the line 6—6 of Fig. 4 which line is also shown in Fig. 3;

Figs. 7, 8, 9, 10 and 11 are fragmentary views showing the relation of the selector plates to the shift bar actuating levers in the various positions they assume when changing gears, the selector plates to the right in each figure being the upper ones when in assembled position;

Fig. 12 is a fragmentary side elevation of the connection at the lower end of the steering column; and Fig. 13 is a section on the line 13—13 of Fig. 4.

Referring now to Figs. 1 and 2 it will be seen that the gear box comprises the usual case A in which the transmission shaft 1 and the lay shaft 2 are mounted, the shaft 1 being in alignment with the driving shaft of the engine and having connection with the propeller shaft by means of a universal joint at 3 (see Fig. 1). In Fig. 2 the gears are shown in neutral position but when the gear 4 is shifted to the left reverse is obtained and when shifted to the right first or low speed is obtained. When the gear 5 is shifted to the left second speed is obtained and when shifted to the right third or high speed is obtained. In the usual form of transmission devices these shifts are made by operating the usual gear shift lever in a manner well known in the art.

I propose however to do away with the gear shift lever and to accomplish the gear shifts in a more convenient manner, as by operation of a foot lever, in this instance the clutch lever 6, the gear which is to be shifted being selected by a setting device 7 conveniently located at the upper end of the steering column. This setting device comprises a lever 8 secured to a shaft 9 extending through and having its bearing in the steering column. A quadrant 10 is provided adjacent the steering wheel, the arms 10 and 11 of which limit the movement of the lever 8 in either direction. It will be noted that this setting device is very similar in construction to the usual gas lever and quadrant, and in fact the usual gas lever and quadrant may be employed. The quadrant has markings corresponding to the shifts in this case reverse, neutral, first, second and third in the order named beginning at the end of the quadrant next the arm 10 which is a stop for reverse position and ending at the opposite end of the quadrant, at which end the arm 11 acts as a stop for third speed position.

Connected to the shaft 9 at its lower end is a suitable mechanism B, here shown as a bevel gear, bevel quadrant and arm, for translating the rotative movement of the shaft to a reciprocatory movement for moving the member 12 with its selector plates to its various positions. A rod 13 is connected at one end to the arm 14 of the mechanism B and at its other end to the member 12 through the medium of a yielding device to be hereinafter more fully described.

Referring now more especially to Figs. 2 to 6 inclusive it will be seen that my selective and gear shifting device is a self contained unit adaptable of being bolted or otherwise secured to the usual cover plate 15 of the gear box in which plate I provide an opening at 16 to accommodate the downwardly extending projections 17 and 18 of a pair of shift bars 19 and 20. The projection 17 of the bar 19 engages the forked member 22 of the gear 5 and the projection 18 of the bar 20 engages the forked member 21 of the gear 4, so that any movement given the bars 19 and 20 will shift their respective gears accordingly. For shifting the bar 19 I provide a lever 23, a similar lever 24 being provided for shifting the bar 20. The free or forked end of these levers engage their respective shift bars. The lever 23 is pivotally mounted or fulcrumed at one end on the bottom plate of the shallow box-like casing 25 and closely adjacent thereto and the lever 24 is similarly mounted on the cover plate 26 of the casing, the pivots for the levers being located on an approximately common axis.

When the lever 23 is rocked to the position shown in Figs. 3 and 4 the shift bar 19 is moved in a direction longitudinally of the shafts so that the gear 5 is directly coupled to the engine shaft for high or third speed, and when it is moved in the opposite direction the bar 19 is moved to engage the gear 5 with the second speed gear, a position intermediate the two positions just described being neutral. Similarly when the lever 24 is rocked from its neutral position to a position corresponding to the third speed position of lever 23, the gear 4 is moved to mesh with the first speed gear, and when moved in the opposite direction gear 4 is moved to mesh with the reverse gear.

The manner in which the levers 23 and 24 are rocked as well as the manner of selecting the lever which is to be rocked will now be described. A pair of operating plates 27 and 28 are located within the casing 25, adjacent the bottom and cover plates respectively and have projecting portions 29 extending outwardly through a cut away portion in an end of the box. These operating plates are quite materially cut away for the purpose of lightness, cross bars 30 and 31 however are left standing to give strength to the plates, which bars are depressed so that the levers may be housed or nested so to speak, within the plates, in other words the levers will be in substantially the same general plane as that of the plates. The plates are further provided with guideways 32 extending crosswise of the plates and longitudinally of the propeller shaft in which are slidably mounted a pair of selector bars 33 and 34 one for each plate. Movement crosswise of the casing 25 is imparted to the selector bars 33 and 34 through the medium of the forked member 12 under control of the setting lever 8 located at the upper end of the steering wheel. The selector bars are provided with notches in their edges adapted to cooperate with projections or lugs on the levers 23 and 24 for the purpose of rocking said levers to various positions to cause shifting of the gears into positions corresponding to the selection made by the operator. The precise manner in which this is accomplished will now be described in connection with Figs. 3, 4 and 7 to 11 inclusive.

The lower selector bar 33 is provided with two notches 35 and 36 located and spaced so that when the lever 8 on the steering column is moved to third speed position indicated by the marking on the quadrant, notch 36 is in such position that when the operating plate 27 with its selector bar 33 is moved lengthwise of the casing 25, by operation of the foot lever 6, it will accommodate the upwardly extending lug 37 of the lever 23. The other lug 38 of the lever 23 however does not register with a notch and is struck by the edge of the bar 33 in its movement, whereby, the lever 23 is rocked on its pivot and the bar 19 moved thereby, throwing the gear 5 into direct connection with the engine. The upper selector bar 34 is provided with similar notches 39 and 40 located and spaced so that when the above selection and operation is performed, neither of its notches 39 or 40 will accommodate the downwardly projecting lugs 41 and 42 of the lever 24, but both lugs will be engaged by the edge of the bar, thus setting the lever in its central or neutral position It is to be noted that in depressing the foot clutch lever 6 the clutch is released which is the usual procedure when changing gears with the ordinary hand lever, but in my device this operation also effects the gear change. In the particular selection just described and shown in Figs. 3, 4 and 7 of the drawings it will be seen that the lower operating plate 27 has a longer travel than the upper operating plate 28, this is by virtue of the slot 36 of the lower selector bar 33 being in line with the lug 37 of lever 23 while the edge of the upper bar engages both lugs 41 and 42 of lever 24 which limits its movement. In order to enable such relative movement of the plates under control of a common actuating medium I provide two separated arms 43 and 44 pivoted on a common pivot pin 45 on which is also pivoted the arm 46 universally connected to the clutch pedal 6. An equalizing rocker member 47 is pivotally mounted in the arm 46 with the axis of its pivot pin 48 extending lengthwise of the arm 46 and crosswise with respect to the arms 43 and 44, which engages the edges 49 and 50 of the arms 43 and 44. When the arm 46 is actuated the separated arms are carried therewith by virtue of the rocking member 47 being interposed therebetween and when one of the operating plates reaches its stop that is, when an unslotted portion of its associated selector bar engages both lugs of its lever, the thrust of the actuating force on the arm 46 is transmitted by means of the rocking member 47 to the other operating plate moving such plate still farther on.

From the foregoing it is obvious that either of the operating plates may be given a greater length of movement than the other, or both may be given the same movement, the movements thereof being determined by the positions of the selector bars.

Fig. 7 shows the relations of the selector bars 33 and 34 to the levers 23 and 24 in third or high speed selection with the levers in the positions they assume after actuation of the foot lever 6. Figs. 8, 9, 10 and 11 show the relations of the bars to the levers in second, first, neutral and reverse selections respectively with the levers in the positions they assume after actuation of the foot pedal.

It is to be observed that the operating plates with their respective selector bars are returned to their normal positions when the pressure is released from the foot lever, by means of contractile springs 51. In such return movement one of the notches 52 on the inside edge of the cross bar 31 of the operating plate 27 engages the upstanding pin 53 in the lever 23 thereby locking the lever in the position to which it was shifted by actuation of the pedal. Similarly the upper lever 24 is locked in its position by one of the notches 54 in the crossbar 31 of the upper operating plate 28 engaging with the downwardly projecting pin 55 of the lever 24.

In order to prevent undue strains on the rod 13 or its associated parts should the lever 8 be shifted when the pedal is in depressed position which locks the selector bars against movement crosswise of the casing by virtue of one of the slots in the selector bars being in engagement with a lever lug, I provide a yielding connection between the rod 13 and the selector bar holding member 12. This yielding connection comprises a bar 56 having two feet 57 and 58 spaced well apart, which bar is normally held in more or less rigid connection with the member 12 by means of an expansion spring 59 bearing at one end against a shoulder 60 in the bar and at its other end against a nut 61 threaded on an eyelet bolt pivotally mounted in the member 12. Thus it will be seen that the feet of the bar 56 are held against the member 12 due to the tension of the spring 59 which may be adjusted to desired tension by means of nut 61, and that the bar 56 and member 12 will move bodily under normal operating conditions. However if any great resistance to movement is offered by the member 12 the connection yields and the bar 56 then rocks on either of its feet according to the direction in which the setting lever 8 is swung, without straining the parts of the setting mechanism. The device is thus foolproof, and may be set for any gear selection irrespective of the positions of the clutch pedal 6 and the selector bars.

From the above description it will be seen that a majority of the parts of my device may be made of stampings which enables the device to be manufactured at extremely low costs and that by utilization of flat members adapted to be stacked and to nest snugly within one another I am enabled to produce a device for the purpose described which is comparatively small both as to depth and lateral dimensions. To be more specific mounting the shift levers one above the other enables me to get compactness crosswise of the casing and the nesting of the parts gives compactness vertically of the casing.

To take the weight of the connecting rod 13 from off the bar 56 and its associated parts I attach a supporting guide 62 to the casing 25 at a suitable point.

It is obvious that the device may be built into new assemblies as well as being applied to existing gear boxes.

If desired a lock 63 may be applied to the lever 8 for locking the mechanism in neutral or other allowable positions.

I claim:

1. A change speed device for automotive vehicles having gears, a plurality of substantially stacked levers for operating the gears, a selective device comprising a plurality of longitudinally and laterally movable stacked members for determining which lever is to be operated and actuating means.

2. In a mechanical gear shift for shifting the gears of a change speed device for automotive vehicles, a bottom plate, a top plate, a pair of shift levers one of which is pivotally mounted on the bottom plate the other on the top plate for rotation about an approximately common axis, a pair of selector bars, one above the other and both lying in planes within the planes of the levers, and a pair of operating plates for operating the levers through the medium of the selector bars, one of which lies in a plane between its selector bar and the top plate and the other of which lies between its selector bar and the bottom plate.

3. In a mechanical gear shift for shifting the gears of a change speed device for automotive vehicles, a bottom plate, a top plate, a pair of shift levers one of which is pivotally mounted on the bottom plate the other on the top plate for rotation about an approximately common axis, a pair of selector bars, one above the other and both lying in planes within the planes of the levers, and a pair of operating plates for operating the levers through the medium of the selector bars, one of which lies in a plane between its selector bar and the top plate and the other of which lies between its selector bar and the bottom plate, said operating plates being so shaped that the respective levers lie in substantially the same general plane therewith.

4. In a mechanical gear shift for shifting the gears of a change speed device for automotive vehicles, an operating plate, a gear shifting lever substantially pocketed in said plate whereby both lie in substantially the same plane, the shifting lever being pivotally mounted for swinging movement in said plane and the operating plate being bodily reciprocable in said plane.

5. In a mechanical gear shift for shifting the gears of a change speed device for automotive vehicles, a pivoted lever, a selector member therefor, an operating plate for operating the lever through the medium of the selector member and having means adapted to lock the free end of the lever.

6. A change speed device for automotive vehicles having transmission gears and shift bars therefor, comprising levers rocking on a common axis and engaging the shift bars, a selector member for each lever in the substantial plane of its associated lever movable in one direction to positions for effecting predetermined movement of the levers when the selector members are moved in another direction, means for moving the members as one in one direction and means for moving the members independently of each other in the other direction.

7. A change speed device for automotive vehicles having transmission gears and shift bars therefor, comprising levers rocking on a common axis and engaging the shift bars, selector members for the levers in the substantial plane thereof movable in one direction to positions for effecting predetermined movement of the levers when the selector members are moved in another direction, means for moving the members as one in one direction and means for moving the members independently of each other in the other direction, together with means for locking the levers in their selected positions.

8. A change speed device for automotive vehicles having transmission gears and shift bars therefor, comprising levers rocking on a common axis and engaging the shift bars, selector members for determining which lever is to be actuated a carrier for each member having a guideway for its selector member permitting crosswise movement thereof but carrying the member bodily therewith when it is moved lengthwise, said carriers lying in substantially the same plane as the levers, means for moving the selector members and means for moving the carriers.

9. A change speed device for automotive vehicles having transmission gears and shift bars therefor comprising members for shifting the bars movable in planes one above the other, a selective member for each of the aforesaid members each lying in a plane parallel and closely adjacent to the plane aforesaid and movable crosswise as one for selective purposes and lengthwise independently of one another for actuating purposes.

10. In a mechanical gear shift for shifting the gears of a change speed device for automotive vehicles, a pair of shift levers mounted for rotation about an approximately common axis, a selector bar for each lever, and an operating plate for operating the levers thru the medium of said bars.

11. In a mechanical gear shift for shifting the gears of a change speed device for automotive vehicles, a pair of shift levers mounted for rotation about an approximately common axis, a selector bar for each lever, an operating plate for each selector bar for operating the levers thru the medium of said bars, means for moving the selector bar in one direction and means for moving the operating plates in a direction other than the direction in which the selector bars are moved by their moving means.

12. A change speed device for automotive vehicles having transmission gears and shift bars therefor, comprising levers rocking on a common axis and engaging the shift bars, selector members for determining which lever is to be actuated, a carrier for each member having a guideway for its selector member permitting crosswise movement thereof but carrying the member bodily therewith when it is moved lengthwise.

In testimony whereof, I have hereunto signed my name.

RAYMOND A. BARTHOLOMEW.